US007735684B2

(12) United States Patent
Coe et al.

(10) Patent No.: US 7,735,684 B2
(45) Date of Patent: Jun. 15, 2010

(54) PILL BOTTLE

(75) Inventors: Matthew Coe, Annandale, NJ (US); Richard Costa, Bedminster, NJ (US); Hung Mach, Fort Lee, NJ (US)

(73) Assignee: One World Designed & Manufacturing Group, Warren, NJ (US)

( * ) Notice: Subject to any disclaimer, the term of this patent is extended or adjusted under 35 U.S.C. 154(b) by 338 days.

(21) Appl. No.: 11/693,452

(22) Filed: Mar. 29, 2007

(65) Prior Publication Data

US 2008/0173666 A1 Jul. 24, 2008

Related U.S. Application Data

(60) Provisional application No. 60/885,732, filed on Jan. 19, 2007.

(51) Int. Cl.
*B65G 47/00* (2006.01)
*B65G 59/00* (2006.01)

(52) U.S. Cl. ........................... 221/265; 221/25; 221/69

(58) Field of Classification Search ..................... 221/1, 221/2, 7, 8, 25, 69, 89, 91, 92, 103, 110, 221/112, 113, 114, 115, 119, 120, 121, 122, 221/123, 133, 154, 155, 208, 255, 256, 257, 221/263, 264, 265, 277
See application file for complete search history.

(56) References Cited

U.S. PATENT DOCUMENTS 630,452 A * 8/1899 Dooley ....................... 221/235
932,983 A * 8/1909 Grubb ........................ 221/265
2,610,100 A * 9/1952 Childers ..................... 221/113
2,828,005 A * 3/1958 Ricke ......................... 206/533
D195,734 S 7/1963 Beaumann
3,162,287 A * 12/1964 Lupovici .................... 194/297
3,227,127 A * 1/1966 Gayle ......................... 116/308
3,339,798 A * 9/1967 Katz .......................... 221/113
3,394,796 A * 7/1968 Jensen ........................ 206/533
3,495,567 A * 2/1970 Gayle et al. ................ 116/308
3,722,739 A 3/1973 Blumberg
3,895,737 A * 7/1975 Phillips ....................... 221/82
3,921,806 A 11/1975 Wawracz
3,926,335 A 12/1975 Dangles et al.
4,124,143 A * 11/1978 Thomas ....................... 221/82
4,319,690 A * 3/1982 Birrell et al. ................ 215/220
4,454,971 A * 6/1984 Poehlmann ................. 224/196
4,460,106 A * 7/1984 Moulding et al. .............. 221/1
4,572,376 A 2/1986 Wrennall
4,572,403 A * 2/1986 Benaroya ....................... 221/3

(Continued)

*Primary Examiner*—Gene Crawford
*Assistant Examiner*—Kelvin L Randall, Jr.
(74) *Attorney, Agent, or Firm*—Duane Morris LLP

(57) ABSTRACT

A pill bottle that includes a first annular wall disposed within an interior portion of the bottle has an outer surface with a plurality of circumferentially spaced, vertically oriented ribs that project outwardly from that surface. A second annular wall is disposed within the interior portion of the bottle in enclosing relation to the first annular wall. The outer and inner surface of the second annular wall undulate so as to define series of troughs and ridges. An adjacent pair of the ribs is located in spaced confronting relation to each of the troughs so as to define a plurality of pill wells. Each pill is arranged and oriented so as to be "on-end" within the bottle. A method is provided for dispensing pills from a bottle.

15 Claims, 13 Drawing Sheets

U.S. PATENT DOCUMENTS 4,611,727 A * 9/1986 Graff .......................... 221/154
4,838,453 A * 6/1989 Luckstead ...................... 221/2
4,939,705 A * 7/1990 Hamilton et al. .............. 368/10
5,005,281 A * 4/1991 Burns .......................... 29/596
5,392,952 A * 2/1995 Bowden ...................... 221/15
5,575,392 A * 11/1996 Cutler ........................ 206/534
5,603,429 A * 2/1997 Mulhauser et al. .......... 221/171
5,664,697 A 9/1997 Lambelet, Jr. et al.
5,678,712 A * 10/1997 Rios .......................... 215/220
6,021,918 A * 2/2000 Dumont et al. ................ 221/2
6,039,208 A * 3/2000 Lambelet, Jr. ................ 221/25
6,098,835 A 8/2000 DeJonge
6,109,252 A * 8/2000 Stevens ..................... 124/51.1
6,193,103 B1 2/2001 Clarijs
6,206,216 B1 * 3/2001 Stalions ...................... 215/220
6,234,343 B1 5/2001 Papp
D451,666 S 12/2001 Zastrow
6,364,155 B1 * 4/2002 Wolfe .......................... 221/25
D460,897 S 7/2002 Leuenberger
6,415,202 B1 * 7/2002 Halfacre ..................... 700/232
6,427,865 B1 * 8/2002 Stillwell et al. ................ 221/4
6,502,717 B1 1/2003 Wolfe
6,510,668 B2 * 1/2003 Kim ............................ 53/154
D473,786 S 4/2003 Chue
6,805,258 B2 10/2004 Cross
D502,801 S 3/2005 Baum
6,874,652 B2 4/2005 Christensen et al.
7,100,793 B2 9/2006 Baum
7,100,797 B2 9/2006 Kahn et al.
7,104,417 B2 9/2006 Hilliard
2006/0225383 A1 * 10/2006 Cobb et al. ................... 53/449

* cited by examiner

PILL BOTTLE

This application claims priority from, and the benefit of U.S. provisional patent application Ser. No. 60/885,732, filed Jan. 19, 2007, and entitled Pill Bottle.

FIELD OF THE INVENTION

The present invention generally relates to bottles suitable for dispensing medications and, more particularly to a pill bottle that provides senior-friendly access while meeting the standards for child-resistant entry, and that also provides for improved compound stability during shipment, storage, and dispensing of the medication.

BACKGROUND OF THE INVENTION

It is well known that medications, e.g., pills, tablets, and capsules must often be dispensed over a prescribed number of consecutive days. In addition, it is also known that such medication dispensers are required by law to be child-resistant while at the same time being relatively easily opened by an elderly or infirm person. Child-resistant containers are known, such as screw-top bottles and flip-top bottles with locking mechanisms. These prior art bottles are often difficult for the elderly to open due to their diminishing manual dexterity. A traditional "amber" bottle closed by a child resistant mechanism incorporated into its cap or top of the bottle has been developed for the dispensing of medication in pill form. These prior art pill bottles suffer from many problems.

A prior art amber bottle typically poses a nuisance for a user of limited dexterity. Often when using such prior art bottles, multiple pills will be handled and put back into the bottle because of difficulty in selecting one pill at a time. This inevitably leads to contamination of the remainder of the pills in the bottle from hand moisture or body oils, often leading to decreased effective shelf-life of the medication. Thus, these bottle often did not address completely or cure the issue of stability/integrity of the medication. Also, with a traditional amber bottle the user does not get any feedback as to whether or not a correct dose has been taken.

Blister packs, often referred to as "unit dosing" packages, are also well known as offering a solution to some of the foregoing problems. They are typically formed of polymers or other flexible materials with a plurality of depressions or blisters that each receive and dispense a pill or capsule. One side of a conventional blister pack is covered with a foil material to seal and secure the pill or capsule in place and so as to provide for compound stability during storage. When finger pressure is applied against a convex portion of the blister, the capsule breaks through the foil material thereby releasing it for consumption. The blister pack often ensured the stability of the medication by isolating and sealing the pill in a single compartment. Unfortunately, blister packs do not provide an adequate child-resistant dispenser. Also, the elderly user may have difficulty releasing the medication from the dispenser in the prescribed manner as a result of diminished finger strength or flexibility.

SUMMARY OF THE INVENTION

The present invention provides a senior-friendly, child-resistant pill bottle that includes a first annular wall disposed within an interior portion of the bottle. The first annular wall has an outer surface with a plurality of circumferentially spaced, vertically oriented protrusions that project radially outwardly from that surface. A second annular wall is disposed within the interior portion of the bottle in enclosing relation to the first annular wall. The outer and inner surface of the second annular wall undulate so as to define a series of troughs and ridges. Advantageously, an adjacent pair of the protrusions is located in spaced confronting relation to each of the troughs formed by the undulating surface of the second annular wall so as to define a plurality of pill wells. In this way, each pill may be arranged and oriented so as to be "on-end" or "on-edge" within the bottle.

In another embodiment, a pill bottle is provided that includes an annular wall disposed within an interior portion of the bottle that has an outer surface with a plurality of circumferentially spaced, vertically oriented ribs that project outwardly from the outer surface. An annular divider is disposed within an interior portion of the bottle in enclosing relation to the annular wall. The annular divider has an outer surface and an inner surface that undulate so as to define a series of troughs and ridges wherein an adjacent pair of the ribs is located in spaced confronting relation to each of the troughs so as to define a plurality of pill wells thereby allowing each pill to be stored resting upon a tip. A rotatable dial closure is disposed in overlying relation to the pill wells that defines a chimney through which successive ones of the pills are delivered upon incremental rotation of the dial closure. A removable closure is disposed in overlying relation to the rotatable dial closure.

In a further embodiment, a pill bottle is provided that includes a first annular wall disposed within an interior portion of the bottle that has an outer surface with a plurality of circumferentially spaced, vertically oriented ribs that project outwardly from the outer surface. A second annular wall is disposed within an interior portion of the bottle in enclosing relation to the first annular wall. The second annular wall has an outer surface and an inner surface that undulate so as to define series of troughs and ridges. An adjacent pair of the ribs is located in spaced confronting relation to each of the troughs so as to define a plurality of pill wells thereby allowing each pill to be stored resting upon a tip. A rotatable dial closure is disposed in overlying relation to the pill wells. The rotatable dial closure defines a chimney through which successive ones of the pills are delivered upon incremental rotation of the dial closure. The rotatable dial closure also includes a dosage-counter disk positioned on a dosage-counter snap tube so that it may be selectively and incrementally rotated when the dial closure is incrementally rotated so as to display an indicia within a counter window so that a patient may determine whether they have taken their medication on any given day.

A method for dispensing pills from a bottle is also provided that includes arranging a plurality of pills so as to define a first circle of pills concentrically surrounding a second circle of pills wherein the first circle of pills is angularly off-set relative to the second circle of pills, i.e., one circle of pills is rotated relative to the other circle of pills by an incremental angular amount. Covering the pills with a rotatable dial closure that has an opening in a top surface that communicates with a corresponding opening in a bottom surface through a dosage access chimney that is sized to receive one pill at a time. Rotating the dial closure an angular increment so that all but one of the pills forming the first circle are covered by the dial closure thereby positioning one of the pills from the first circle in substantially coaxially aligned relation with the dosage access chimney. Causing the substantially coaxially aligned pill to enter the dosage access chimney and thereby exit the bottle. The dial closure is then rotated by another angular increment so that all but one of the pills forming the second circle of pills are covered by the dial closure thereby positioning one of the pills forming the second circle of pills in substantially coaxially aligned relation with the dosage access chimney. This next pills is then caused to enter the dosage access chimney and thereby exit the bottle.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein.

DETAILED DESCRIPTION OF THE PREFERRED EMBODIMENT

Figure 1:
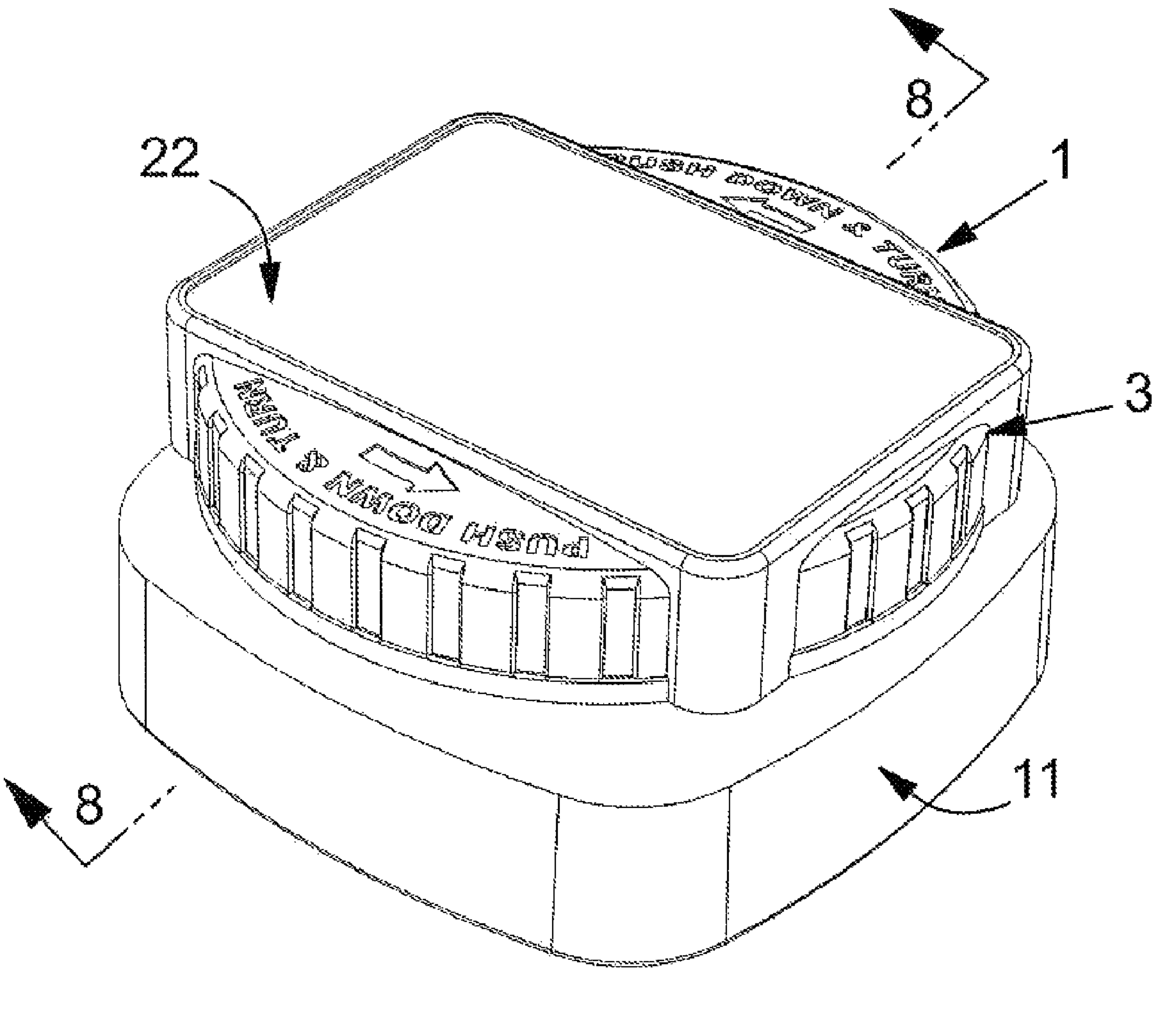
FIG. 1 is a perspective view of a pill bottle formed in accordance with the present invention.
Figure 2:
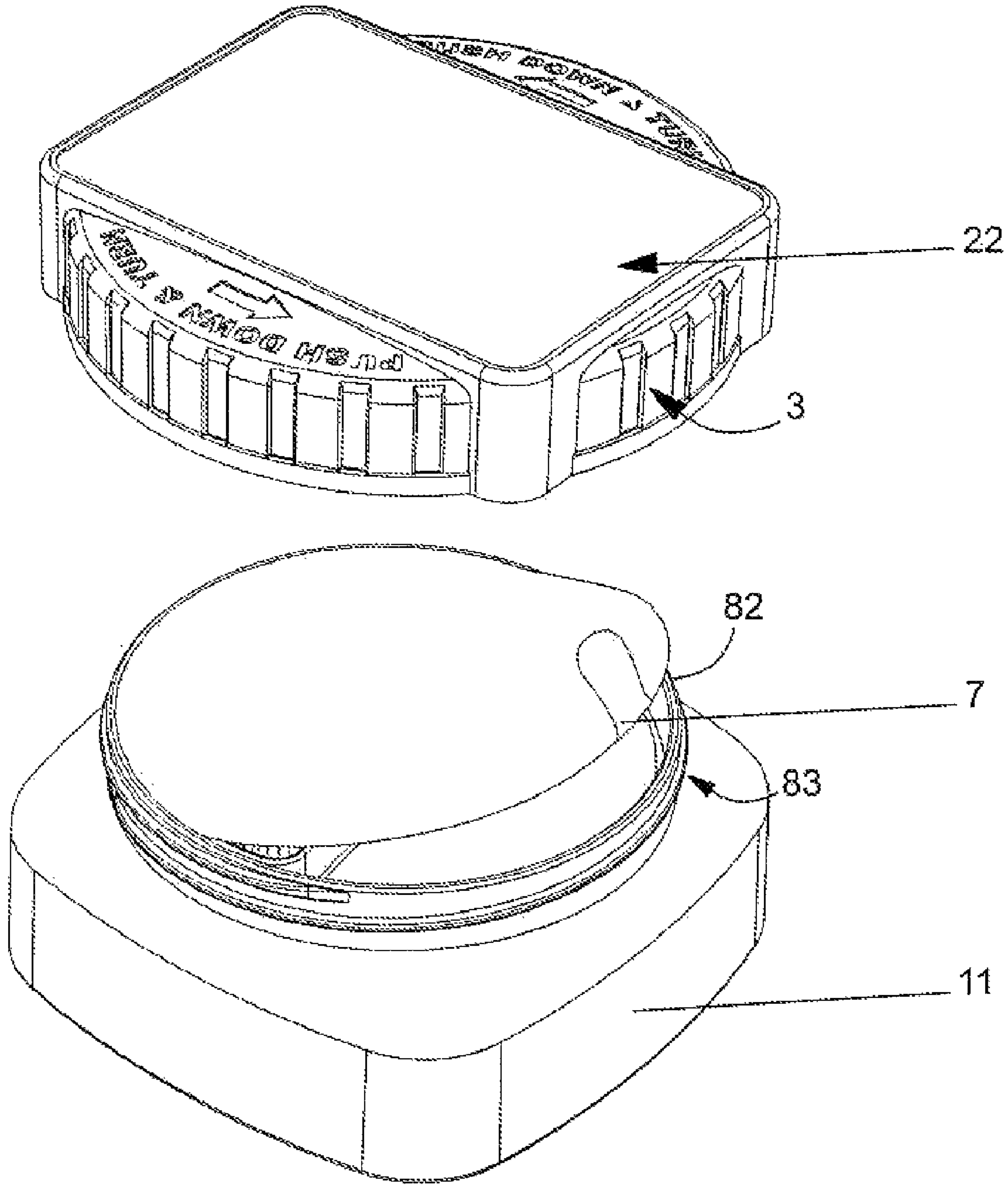
FIG. 2 is a partially-exploded perspective view of the pill bottle shown in FIG. 1.
Figure 3:
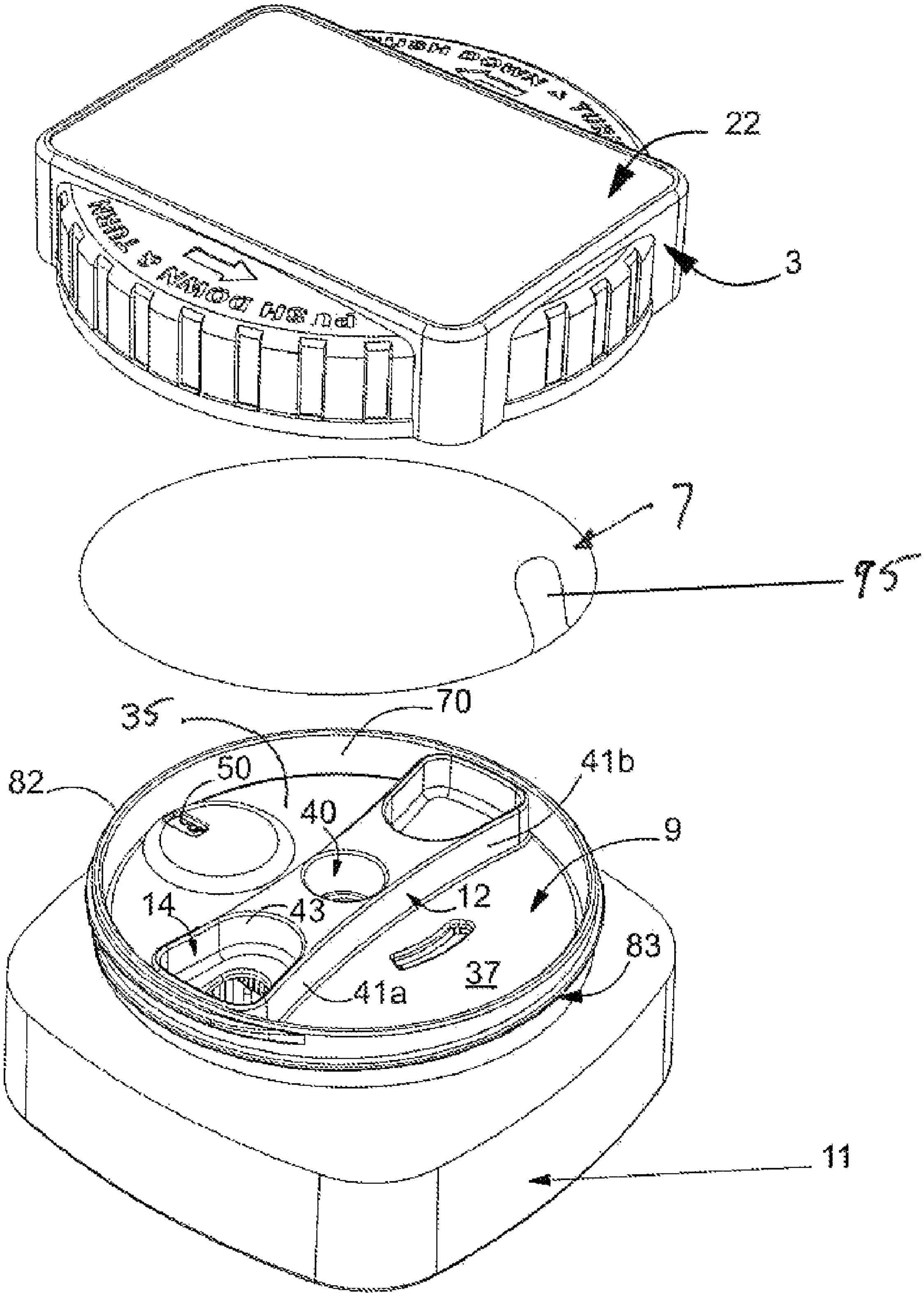
FIG. 3 is a partially-exploded perspective view similar to FIG. 2, with a peel-away foil seal removed from the mouth of the pill container for clarity of illustration.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as “horizontal,” “vertical,” “up,” “down,” “top” and “bottom” as well as derivatives thereof (e.g., “horizontally,” “downwardly,” “upwardly,” etc.) should be construed to refer to the orientation as then described or as shown in the drawing figure under discussion. These relative terms are for convenience of description and normally are not intended to require a particular orientation. Terms including “inwardly” versus “outwardly,” “longitudinal” versus “lateral” and the like are to be interpreted relative to one another or relative to an axis of elongation, or an axis or center of rotation, as appropriate. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise. The term “operatively connected” is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

Figure 4:
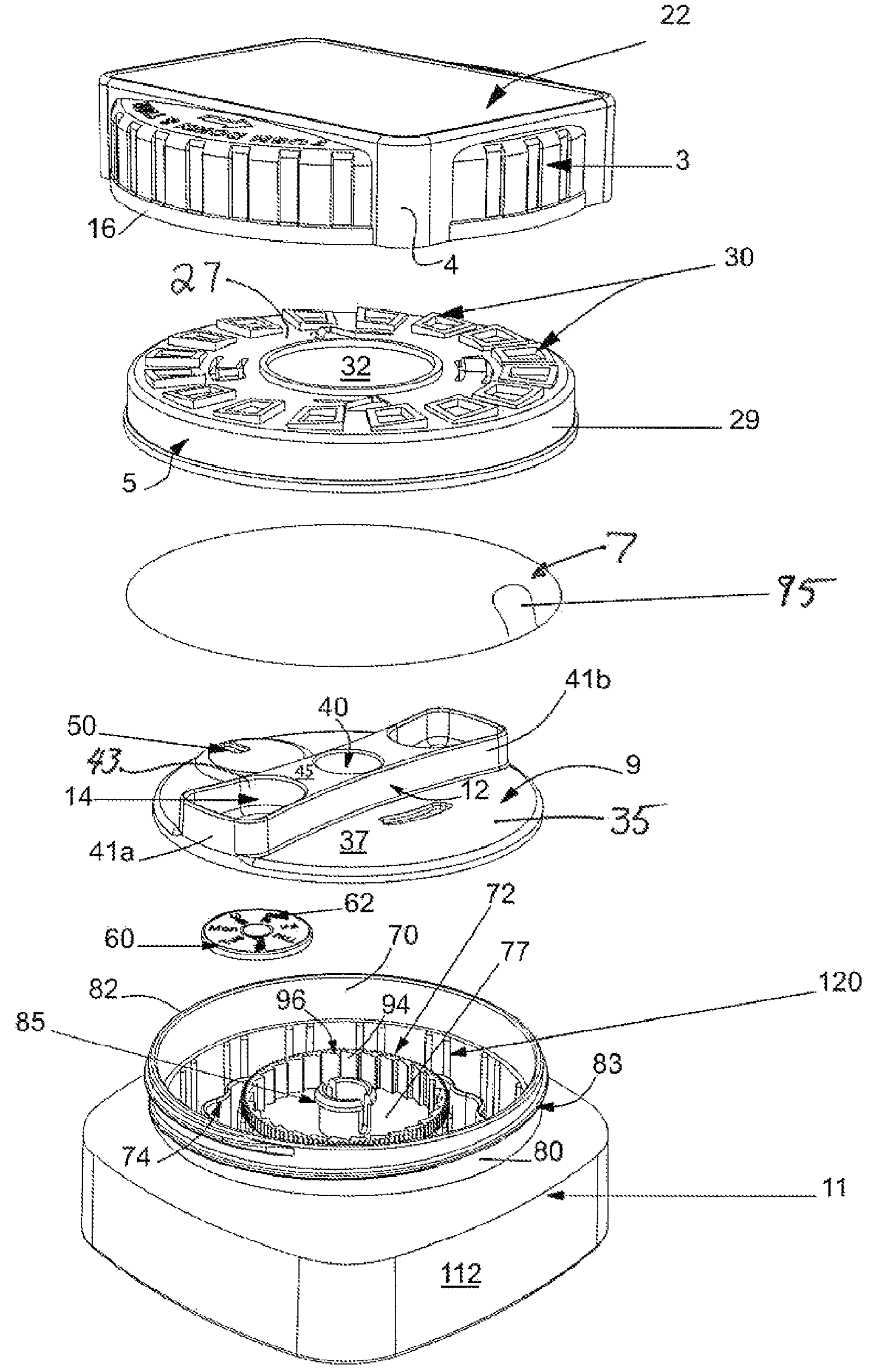
FIG. 4 is a perspective exploded view of the pill bottle shown in FIGS. 1-3.
Figure 5:
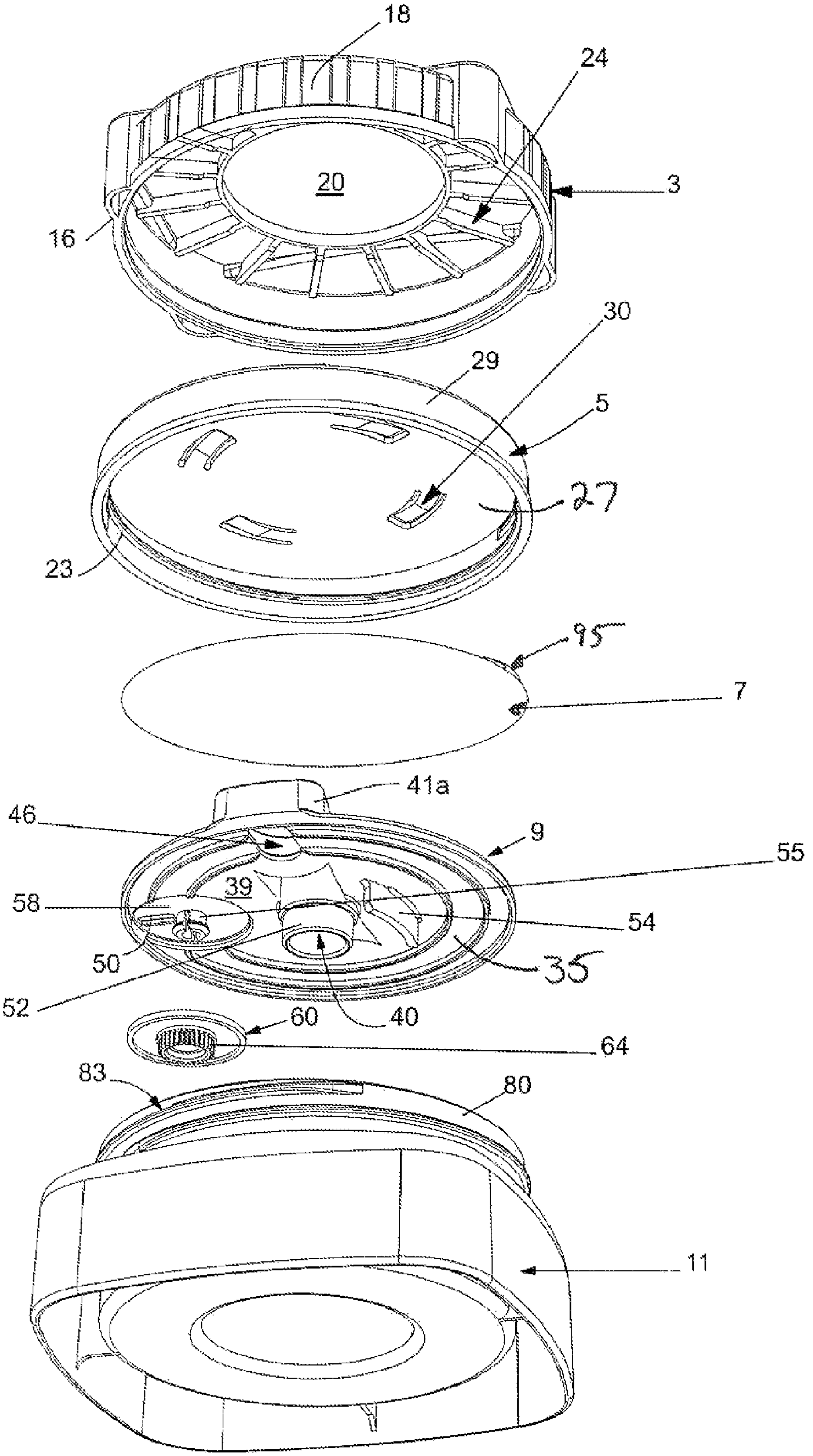
FIG. 5 is an alternative perspective exploded view of the pill bottle shown in FIG. 4.
Figure 6:
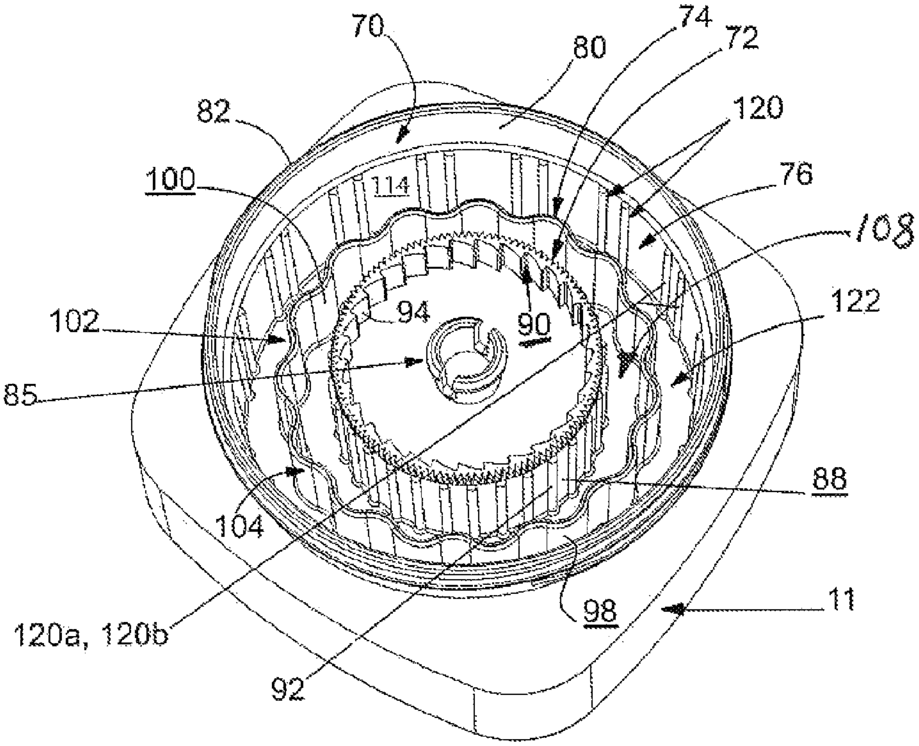
FIG. 6 is a top perspective view of a container formed in accordance with the present invention.
Figure 7:
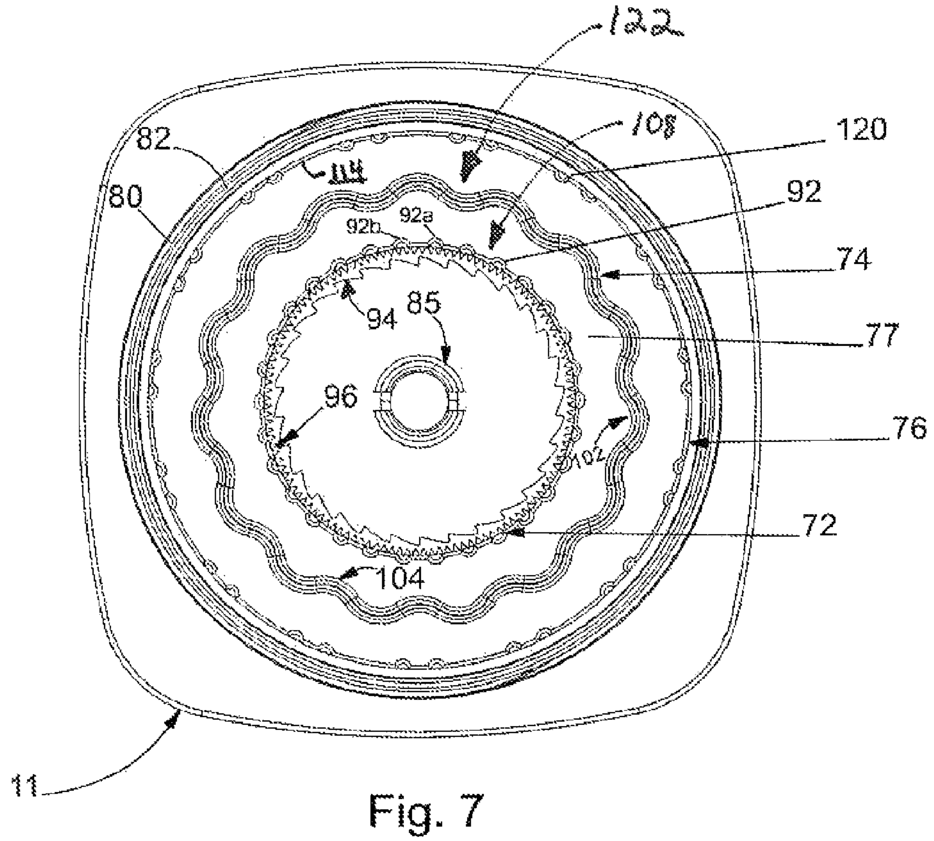
FIG. 7 is a top plan view of the container shown in FIG. 6.
Figure 8:
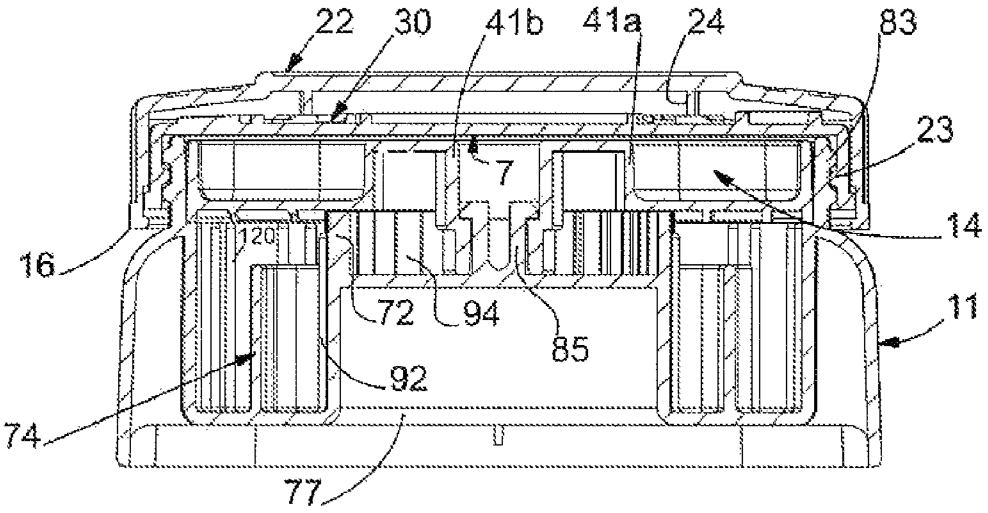
FIG. 8 is a cross-sectional view of the pill bottle shown in FIG. 1, as taken along line 8-8 in FIG. 1.
Figure 9:
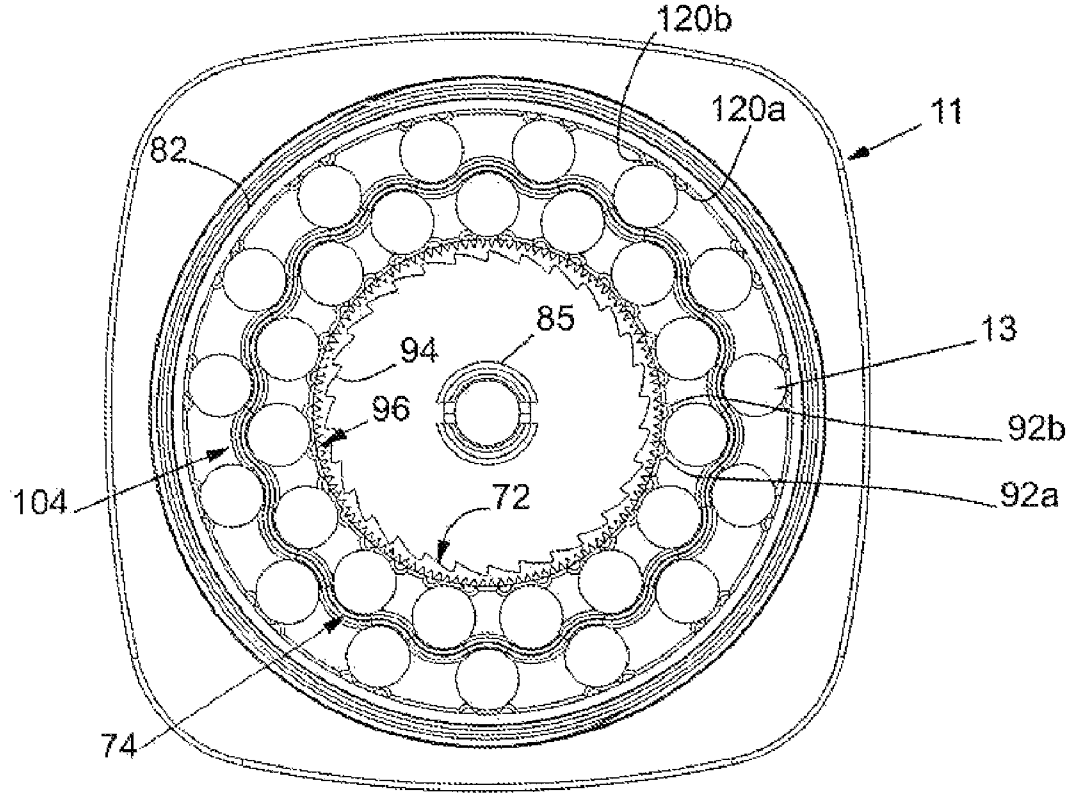
FIG. 9 is a top plan view of a container portion of a pill bottle formed in accordance with the present invention having a plurality of pills situated in pill wells within the container.
Figure 10:
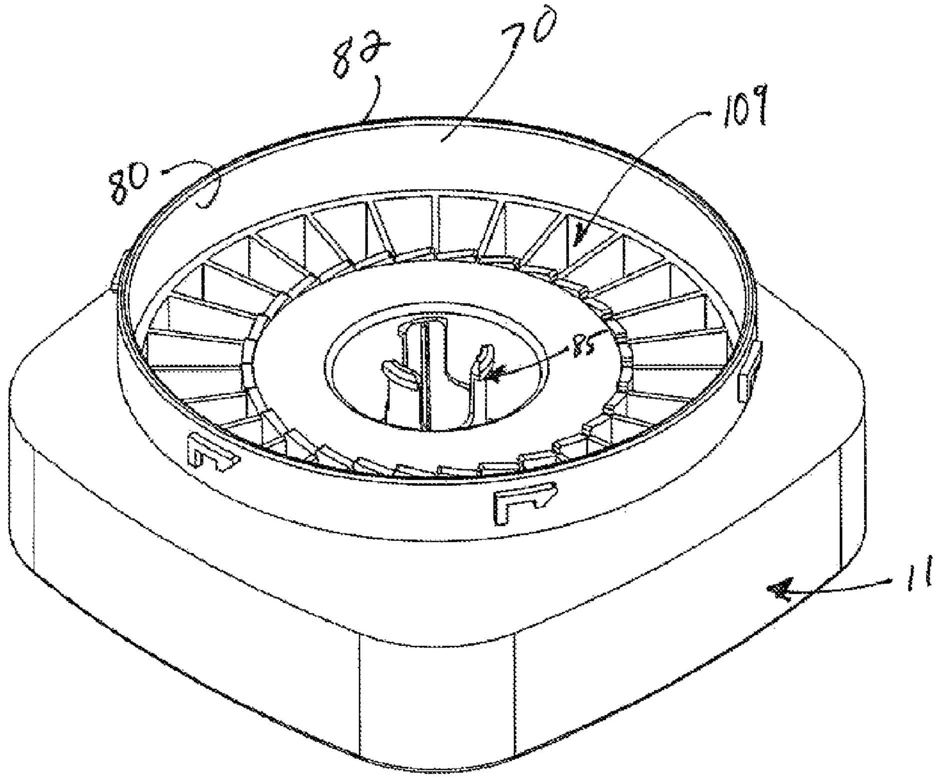
FIG. 10 is a top perspective view of a container formed in accordance with an alternative embodiment of the present invention.
Figure 11:
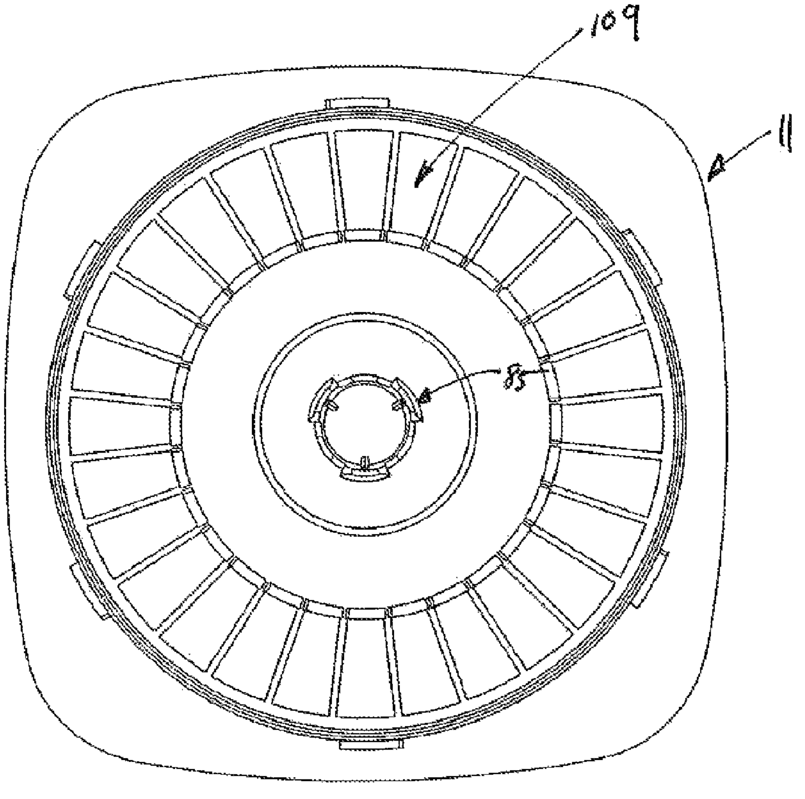
FIG. 11 is a top plan view of the container shown in FIG. 10.
Figure 12:
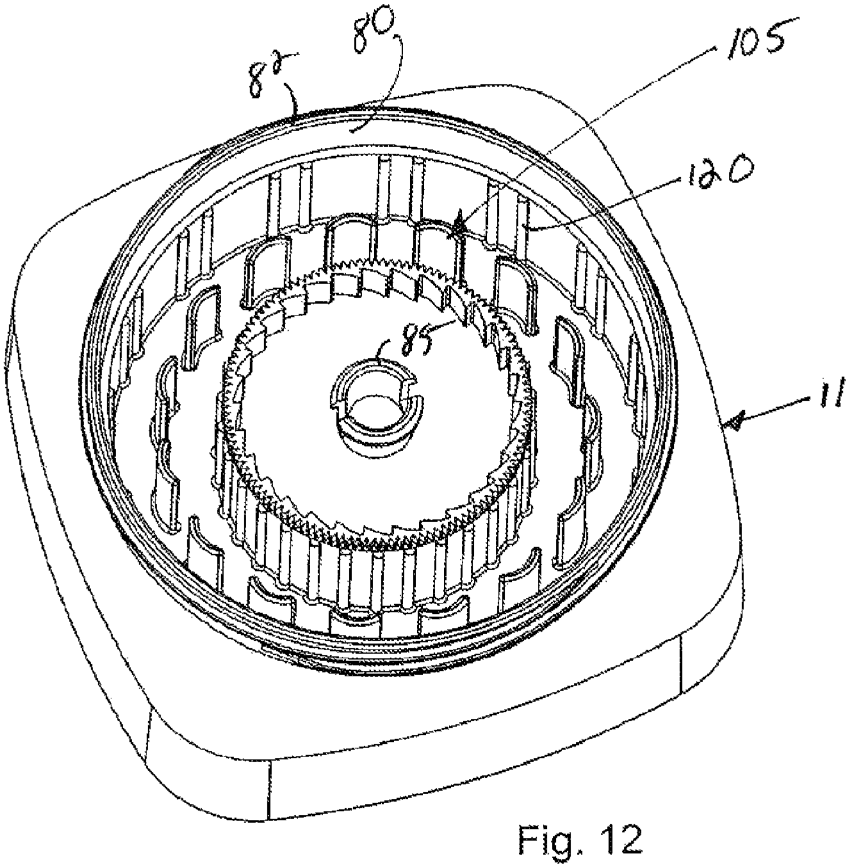
FIG. 12 is a top perspective view of a container formed in accordance with a further alternative embodiment of the present invention.
Figure 13:
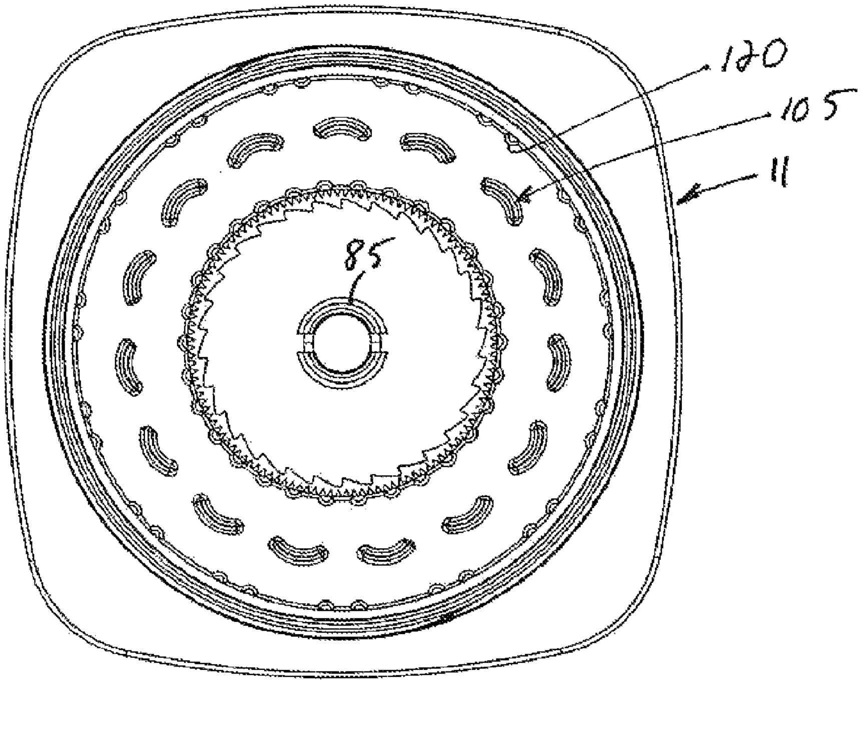
FIG. 13 is a top plan view of the container shown in FIG. 12.
Figure 14:
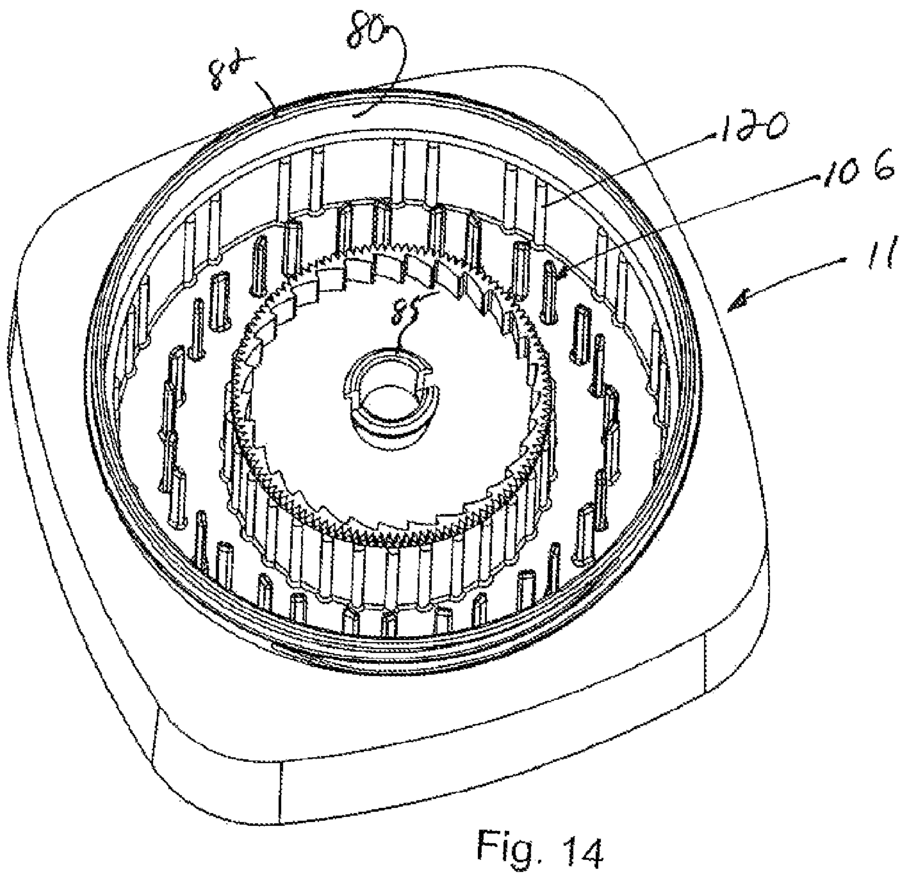
FIG. 14 is a top perspective view of a container formed in accordance with yet another alternative embodiment of the present invention.
Figure 15:
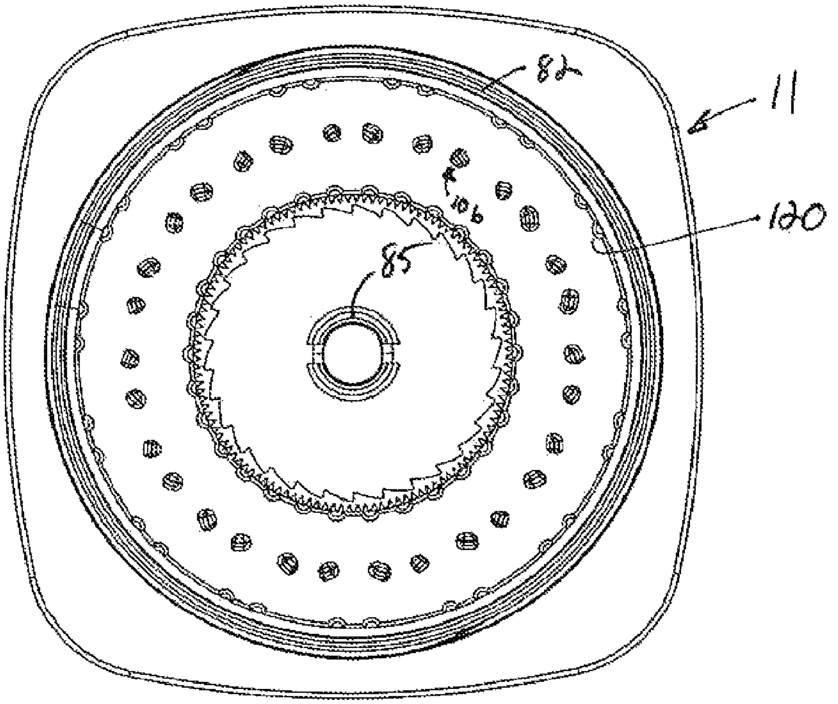
FIG. 15 is a top plan view of the container shown in FIG. 14.
Figure 16:
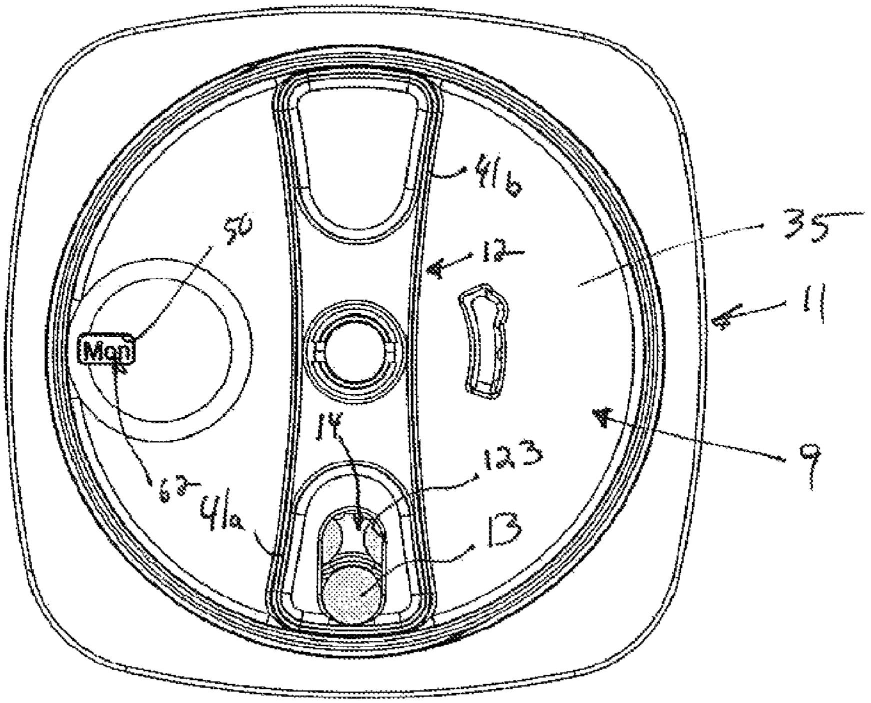
FIGS. 16-19 are each a top plan view of a pill bottle formed in accordance with one embodiment of the invention depicting a typical succession of steps for releasing a first and then a second pill from its respective pill well.
Figure 17:
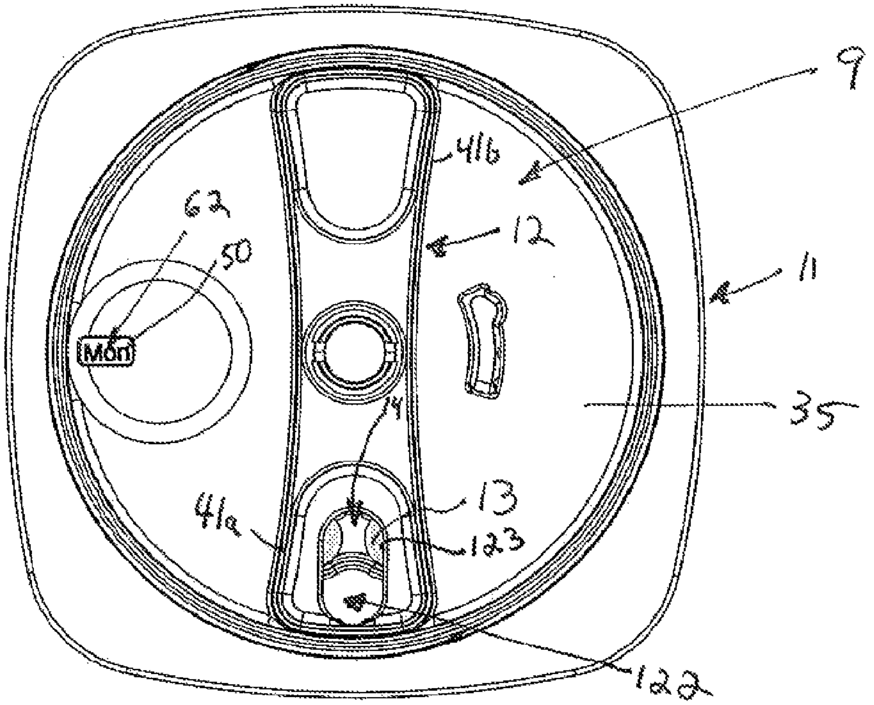
Figure 18:
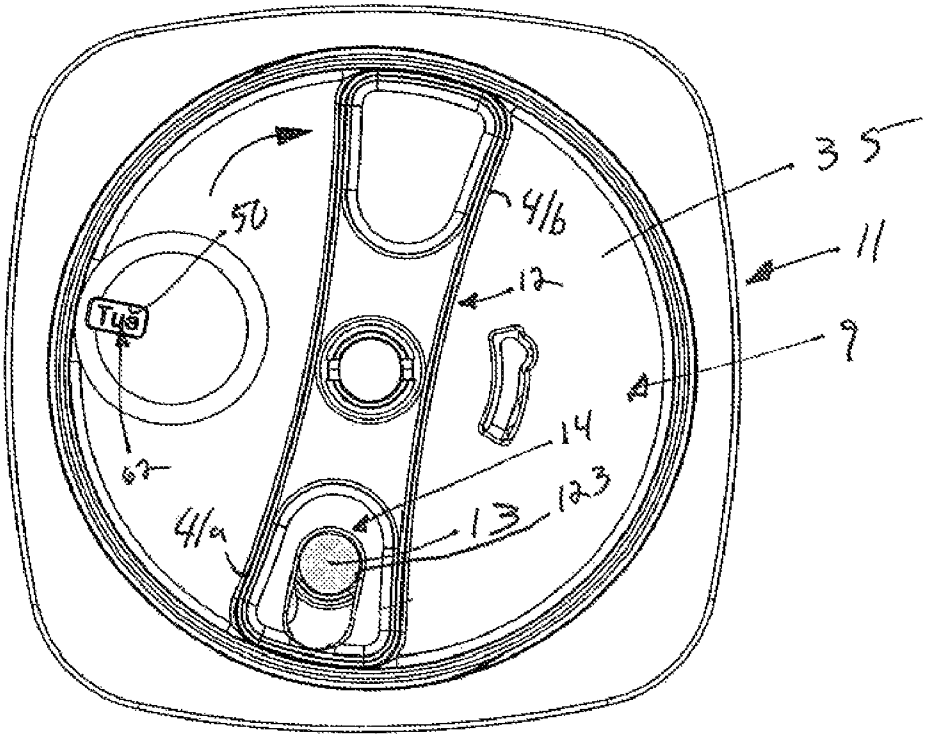
Figure 20:
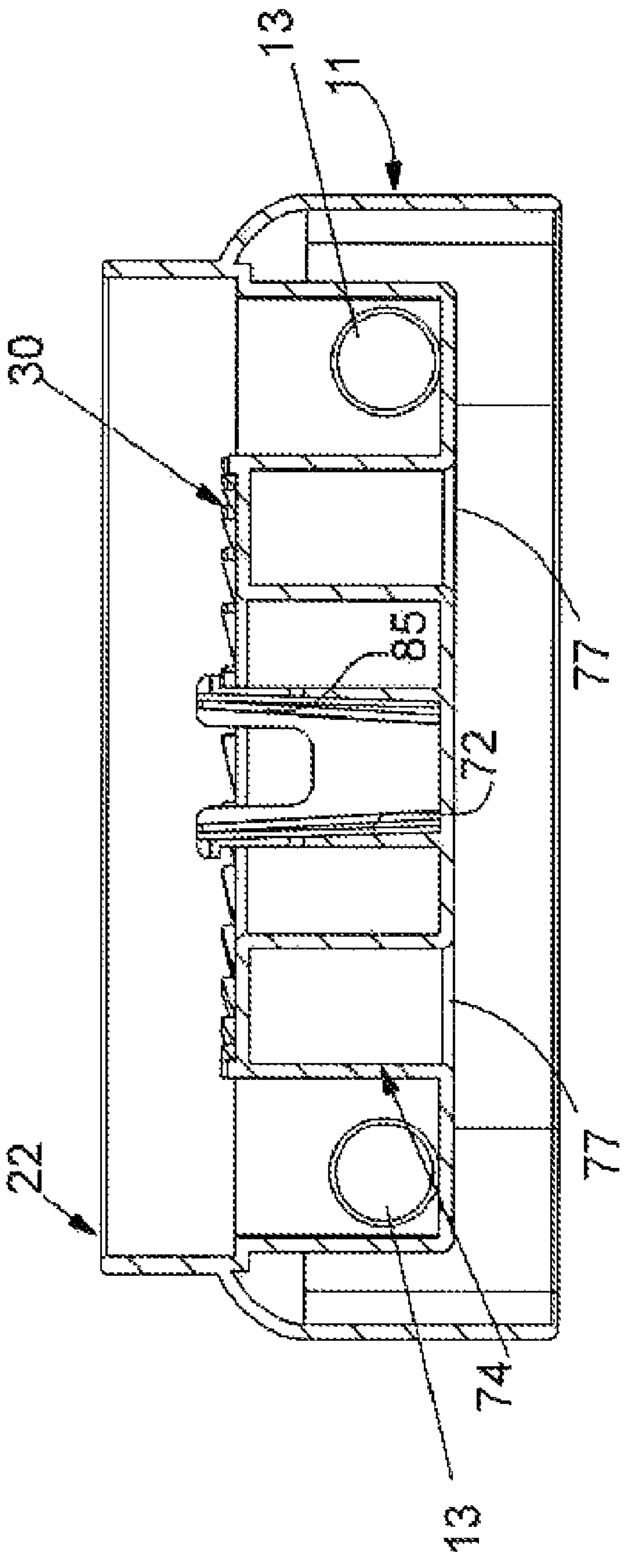
FIG. 20 is a cross-sectional view of a pill bottle formed in accordance with the present invention and illustrating a tablet-style pill arranged on its edge, ready for dispensing in accordance with the methods of the present invention.

Referring to FIGS. 1-4, a senior-friendly, child-resistant pill bottle 1 is provided that combines the benefits of a conventional blister pack pill dispenser with a unit dose pill bottle, and includes a cap assembly 3, a dial 9, and a container 11. Cap assembly 3 includes a cap 4 having an enlarged outer diameter so as to be easily gripped and a child-resistant closure 5 (FIGS. 4 and 5). These features are provided in pill bottle 1 to make the device more senior-friendly, while at the same time meeting the applicable child-resistance standards. A handle 12 is provided on dial 9 that includes a dosage-access chimney or passageway 14 to allow the user to eject one pill at a time for ingestion. A peel-away foil seal 7 sealingly engages the rim of container 11, above dial 9, so as to prevent contamination and guard compound stability during storage of pill bottle 1. Peel-away foil seal 7 must be removed before a user is able to access the rotatable dial 9. Advantageously, each pill 13 is preferably arranged and oriented “on-end” or “on-edge” within container 11, so as to be arranged and oriented to rest within the pill bottle on either a tip end (FIG. 9) or edge (FIG. 20).

Senior-friendly, child-resistant pill bottle 1 ensures compound stability while providing easy and safe access to the stored medication by using the peel-away foil seal during initial shipping and storage and rotatable dial 9 after removal of the peel-away seal to allow for only one pill to be exposed to the environment at a time. This construction minimizes the possibility of contamination of yet undisturbed pills. Senior-friendly, child-resistant pill bottle 1 also provides a benefit in the manufacturing of the prescription medication and its packaging. The arrangement of pill wells within the bottle is such that a conventional blister pack machine of the type currently in use by pharmaceutical packagers may be used with the present invention without need for modifications to the packaging machines or assembly process. The larger child-resistant cap allows for a larger space for patient information, making it easier for the patient to read the information that is usually on the often rounded, vertically oriented face of a conventional pill bottle.

More particularly, enlarged cap 4 of cap assembly 3 includes a brim 16 having an annular wall 18 projecting outwardly from a bottom surface 20. Brim 16 often includes a recess 22 that is sized and shaped to receive a label or other identifier of the type well known in the art. Bottom surface 20 includes one or more integrally molded drive lugs 24 that are circularly disposed adjacent to the interior surface of annular wall 18. Child-resistant closure 5 comprises a circular base 27 and a peripheral annular wall 29, and is complimentarily sized and shaped so as to be fitted within cap 4. Circular base 27 has an outer diameter that is less than the inner diameter of annular wall 18 of cap 4. Annular wall 29 projects downwardly from the peripheral edge of the bottom surface of circular base 27. A plurality of ratchet lugs 30 are integrally formed with, and circularly disposed about a top surface 32 of circular base 27 in complementary relation to drive lugs 24 on bottom surface 20 of cap 4. The inner surface of annular wall 18 often includes a thread or bayonet-type mount 23.

Referring to FIGS. 4 and 5, dial 9 includes a shield 35 having a top surface 37, a bottom surface 39, and a central opening 40. Handle 12 comprises two diametrically opposed grips 41*a* and 41*b* that each project upwardly from top surface 37, with central opening 40 disposed between them. Grip 41*a* defines an opening 43 in a top surface 45 that communicates with a corresponding opening 46 in bottom surface 39, through dosage access chimney 14. A counter window 50 is defined adjacent to a peripheral edge of dial 9. An axle-tube 52 projects downwardly from bottom surface 39 in coaxial annular relation to central opening 40. A dial ratchet 54 and a dosage counter snap-tube 55 each project downwardly from bottom surface 39 in substantially opposed spaced relation to one another about axle-tube 52 (FIG. 5). Dosage-counter snap tube 55 is central located within a dosage counter recess 58 formed in bottom surface 39 of dial 9, which forms a corresponding prominence on top surface 37 of dial 9. In one embodiment of the invention, a dosage-counter disk 60 is assembled to the under side of dial 9. The top surface of dosage-counter disk 60 has indicia 62, e.g., numbers or letters, etc., that are representative of time period intervals such as days of the week or months of the year. A gear 64 projects downwardly from the bottom surface of dosage-counter disk 60, often in annular relation to the center of dosage-counter disk 60.

Referring to FIGS. 4 and 6-15, container 11 includes a mouth 70, an annular gear wall 72, an annular divider 74, an annular container wall 76, and a base wall 77. More particularly, mouth 70 is defined by an annular wall 80 that includes a rim 82 and an outer surface that often includes a thread or bayonet-type mount 83 that complements thread or bayonet-type mount 23 on the inner surface of annular wall 18 of enlarged cap 4. A snap tube 85 projects upwardly from a central portion of base wall 77. Annular gear wall 72 comprises an outer surface 88 and an inner surface 90, and projects upwardly from base wall 77 in radially-spaced, coaxial relation to snap tube 85. A plurality of circumferentially spaced, vertically oriented protrusions, e.g., ribs 92, project radially outwardly from outer surface 88. A plurality of circumferentially arranged dial gear-teeth 94 project inwardly from inner surface 90 of annular gear wall 72. A plurality of circumferentially arranged dosage counter gear-teeth 96 project inwardly from inner surface 90 of annular gear wall 72 and are positioned atop dial gear-teeth 94.

Annular divider 74 is preferably, but not always formed as a continuous annular wall that projects upwardly from base wall 77. One embodiment comprises an outer surface 98 and an inner surface 100, and projects upwardly from base wall 77 in radially-spaced, coaxial relation to both snap tube 85 and annular gear wall 72. Advantageously, both outer surface 98 and inner surface 100 continuously undulate radially relative to snap tube 85 so as to define, e.g., a sinusoidally alternating series of troughs 102 and ridges 104. Each trough 102 defined by outer surface 98 corresponds to a ridge 104 defined by inner surface 100, likewise each ridge 104 defined by outer surface 98 corresponds to a trough 102 defined by inner surface 100. Troughs 102 and ridges 104 may define a smooth, sinusoidal curve or a more angular, saw tooth shape. A confronting pair of adjacent ribs 92*a*,92*b* is located in spaced confronting relation to each of troughs 102 defined by inner surface 100 so as to define a plurality of pill wells 108 between annular gear wall 72 and annular divider 74. In another embodiment, annular divider 72 may be formed as a series of annularly arranged, spaced barriers 105 or posts 106 instead of a continuous undulating wall (FIGS. 10-15). In one less preferred embodiment, a plurality of individual compartments 109 may be formed in annular relation to snap tube 85 and annular gear wall 72 and into which pills 13 may be fed.

Annular container wall 76 comprises an outer surface and an inner surface 114, and projects upwardly from the peripheral edge of base wall 77 in radially-spaced, coaxial relation to both snap tube 85, annular gear wall 72, and annular divider 74. A plurality of circumferentially spaced, vertically oriented ribs 120 project outwardly from inner surface 114. A confronting pair of adjacent ribs 120*a*,120*b* is located in spaced confronting relation to each of troughs 102 defined by outer surface 98 of annular divider 74 so as to define a plurality of pill wells 122 between annular divider 74 and annular container wall 76. In preferred embodiments of the invention, pill wells 108, 122 combine to allow for the arrangement of a plurality of pills 13 so as to define a first circle of pills (located in pill wells 108) that is concentrically surrounded by a second circle of pills (located in pill wells 122) with the first circle of pills being angularly off-set with respect to the second circle of pills, i.e., clockwise or counter-clockwise, by an angular incremental amount, e.g., between about 3° and about 9°, with about 6° being preferred (FIGS. 9, and 16-19). This arrangement of pills 13 and dial closure 9 within senior-friendly, child-resistant pill bottle 1 advantageously provides for a minimum exposure of yet to be dispensed pills during dispensing of a single pill.

Senior-friendly, child-resistant pill bottle 1 may be charged with medication by any number of conventional packaging machines and methods. By way of example only, senior-friendly, child-resistant pill bottle 1 may be filled with pills 13 in a packaging machine of the type that has a portion suitable for separating a quantity of loose pills 13 into individualized compartments to thereby separately feed each pill 13 through a chute in an end-to-end orientation so as to be positioned such that each pill 13 may be individually positioned within a pill well 108,122. Loose pills 13 may also be separated into pairs or larger groupings for gang insertion into pill wells 108,122. In a preferred arrangement, where prolate, oblong or elliptically shaped pills are being packaged and stored within container 11, troughs 102 and ribs 92,120 advantageously combine to allow for "on-end" storage of pills 13 within container 11, i.e., pills that are arranged and oriented to rest within the pill bottle on a tip end so that each pill has its long axis aligned with a vertical orientation, that is often substantially parallel to annular divider 72. This arrangement of pills 13 advantageously provides for the minimum pill surface area to be exposed to outside environments during handling of container 11. Of course, senior-friendly, child-resistant pill bottle 1 may house and dispense a very wide variety of pills, tablets, and lozenges, i.e., any shaped cake of a fixed amount of a compressed powdered drug, usually intended to be swallowed whole or dissolved in the mouth, and of widely varying sizes, shapes, and compositions. Once pill wells 108, 122 have been fully charged with pills 13, dial 9 may be assembled to container 11.

More particularly, dial 9 is oriented so that axle-tube 52 is aligned in confronting coaxial relation with snap tube 85 of container 11. Once in this position, dial 9 is moved toward container 11 until snap tube 85 enters and securely engages an inner portion of axle-tube 52. At the same time, dial ratchet 54 slips into operative engagement with one of the corresponding dial gear teeth 94 disposed upon inner surface 90 of annular gear wall 72. As a result of this construction, when grips 41*a* and 41*b* are rotated clockwise, dial 9 freely rotates clockwise about snap tube 85 within container 11, but is restrained from rotating counterclockwise by the operative engagement of dial ratchet 54 with one of the corresponding dial gear teeth 94. In this way, chimney 14 within grip 41*a* may be selectively and incrementally positioned above a selected one of pill wells 108,122 so as to gain access and release of a pill 13 from container 11. In the same way, positioning chimney 14 above a previously visited and now empty pill well 108, 122 is prevented by the interaction of dial ratchet 54 and corresponding dial gear teeth 94 (FIGS. 16-19).

Figure 19:
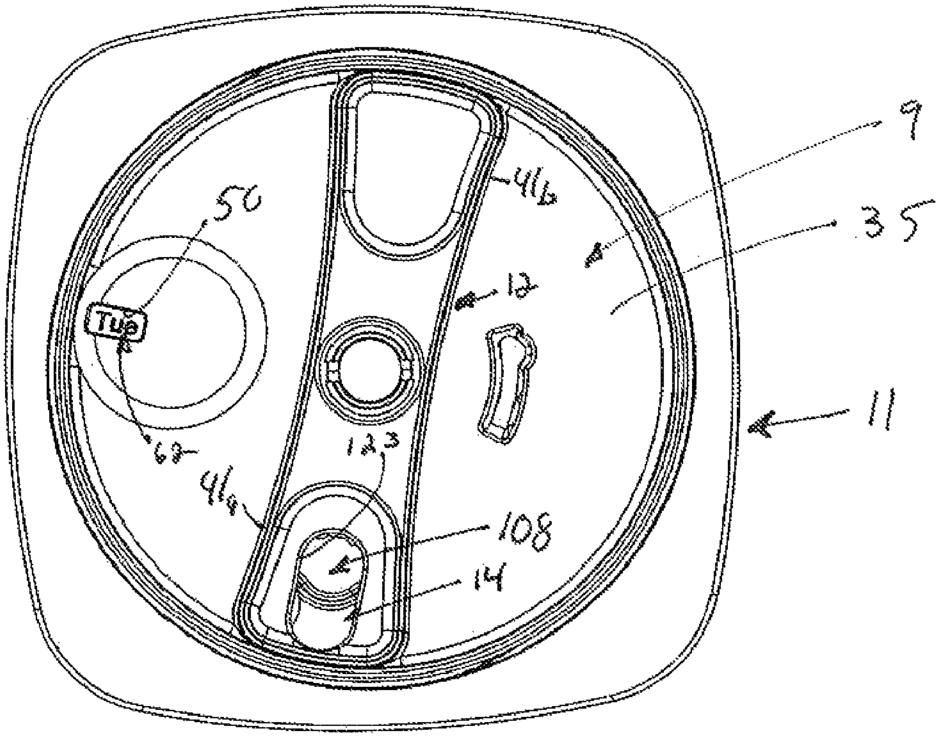

Referring to FIGS. 16 through 19, when chimney 14 is located in position so that a pill 13 located in a pill well 122 (FIG. 16) may freely exit container 11 through chimney 14, a next pill 13 that is located in an adjacent pill well 108 will be partially blocked from entering chimney 14 by the edge 123 of shield 35 that defines opening 46 (FIGS. 4, 5, and 16-19). Once dial 9 is advanced (rotated) a next incremental, angular amount, e.g., 2°, 4°, 6°, etc., (FIG. 18 chimney 14 moves into alignment over that next adjacent pill 13, e.g., located in a pill well 108, which may then enter chimney 14 for access by the patient (FIG. 19).

Once dial 9 has been rotatably secured to snap tube 85, peel-away foil seal 7 is sealingly attached to rim 82 of container 11 thereby ensuring compound stability for the medications stored within container 11. Peel-away foil seal 7 often has a tab 95 extending from a peripheral portion to facilitate its removal from mouth 70 of container 11. Cap assembly 3 is then positioned above peel-away foil seal 7 and mouth 70 of container 11 so that circular base 27 of child-resistant closure 5 is aligned in confronting coaxial relation with mouth 70 of container 11. In this position, plurality of ratchet lugs 30 are positioned in confronting adjacent relation to bottom surface 20 and drive lugs 24 of cap 4. Cap assembly 3 is then moved toward mouth 70 of container 11 until thread or bayonet-type mount 23 of child-resistant closure 5 engage corresponding complementary thread or bayonet-type mount 83 located on annular wall 80 of container 11.

In one embodiment of the invention, dial 9 has dosage-counter disk 60 positioned on dosage-counter snap tube 55 so that it may be selectively and incrementally rotated. When snap tube 85 of dial 9 enters and securely engages the inner portion of axle-tube 52, gear 64 on the underside of dosage-counter disk 60 slips into operative engagement with one of the corresponding dosage-counter gear teeth 96 disposed above dial gear-teeth 94 on annular gear wall 72. As a consequence of a differential gear relationship between dial gear teeth 94 and dosage-counter gear teeth 96, dosage-counter disk 60 may be advanced, i.e., rotated, a predetermined amount depending upon the interval between dosages of the medication delivered by pill 13. For example, when pill bottle 1 is first used, dial 9 is rotated so as to position an appropriate indicia 62, e.g., a day-of-the-week symbol (FIGS. 16-19) within counter window 50 to initialize the day that the patient begins their treatment with the medication. If the first day is a Monday, dial 9 is rotated with respect to container 11 thereby causing rotation of dosage-counter disk 60 resulting from the interaction of dosage-counter gear teeth 96 with dial gear teeth 94. Once the marking for Monday appears through counter window 50, the patient may dispense a pill 13 from, e.g., pill well 108 via chimney 14 in grip 41*a*.

In the following days, the patient merely rotates dial 9 with respect to container 11 in a clockwise motion an angular incremental amount, e.g., between about 2° and about 10° depending upon the size of the pills being stored, so as to position chimney 14 above a successive next pill 13 in. e.g., a next successive pill well 108 or 122. The patient simply checks counter window 50 to determine whether they have taken their medication on any given day. It should be understood that when pill wells 108, 122 are fully charged with pills 13, many days' dosage of medication may be supplied in a single pill bottle 1, e.g., 28 days, 31 days, 40 days, 60 days, etc. The correspondence of indicia 62 on dosage-counter disk 60 with the dispensing of medication is achieved by adjusting the gear ratio between dial gear teeth 94 and dosage-counter gear teeth 96. For example, a gear ratio of 7 to 28 will allow for a proper number of revolutions of dosage-counter disk 60 upon 4 revolutions of dial 9 with respect to container 11 to provide four weeks of daily administered drug dispensing. It should be noted that a wide variety of gear ratios between dial gear teeth 94 and dosage-counter gear teeth 96 are available to suit a wide variety of daily dosage regimens prescribed by a physician, and are therefore within the scope and spirit of the present invention.

It is to be understood that the present invention is by no means limited only to the particular constructions herein disclosed and shown in the drawings, but also comprises any modifications or equivalents within the scope of the claims.

What is claimed is:

1. A pill bottle comprising:

an internal annular wall having an outer side surface with a plurality of circumferentially spaced, vertically oriented first protrusions that project radially outwardly from said outer side surface;

an internal annular divider disposed in radially spaced enclosing relation to said internal annular wall, and having an outer side surface and an inner surface that both undulate so as to define troughs and ridges wherein an adjacent pair of said first protrusions is located in spaced confronting relation to each of said troughs thereby defining a plurality of pill wells that allow each of a plurality of pills to be stored resting upon at least one of a tip and an edge; and an outer annular wall arranged in spaced apart surrounding relation to said internal annular wall and said internal annular divider, and including a plurality of circumferentially spaced, vertically oriented second protrusions that project radially inwardly from an inner side surface wherein an adjacent pair of said second protrusions is located in spaced confronting relation to a trough defined by said outer side surface of said internal annular divider thereby defining a second plurality of pill wells that allow each of a further plurality of pills to be stored resting upon at least one of a tip and an edge.

2. A pill bottle according to claim 1 wherein all but one of said pill wells are at least partially covered by a dial closure disposed in overlying rotatable relation to said internal annular divider.

3. A pill bottle according to claim 2 wherein said dial closure defines an opening in a top surface that communicates with a corresponding opening in a bottom surface through a dosage access chimney that is sized to receive one pill at a time.

4. A pill bottle according to claim 2 wherein a counter window is defined adjacent to a peripheral edge of said dial closure and a dosage-counter disk is assembled to an underside of said dial closure.

5. A pill bottle according to claim 4 wherein a top surface of said dosage-counter disk includes indicia that are representative of time period intervals wherein at least one of said indicia is visible through said counter window.

6. A pill bottle according to claim 4 wherein a top surface of said dosage-counter disk includes indicia that are representative of time period intervals wherein at least one of said indicia is visible through said counter window and further wherein an incremental rotation of said dial closure causes a corresponding incremental rotation of said dosage-counter disk so as to position a next one of said indicia within said counter window.

7. A pill bottle according to claim 5 wherein a gear projects downwardly from a bottom surface of said dosage-counter disk in annular relation to a center of said dosage-counter disk.

8. A pill bottle according to claim 7 wherein a gear is defined on an upper surface of said an internal annular wall that is complementary to said gear that projects downwardly from said bottom surface of said dosage-counter disk.

9. A pill bottle according to claim 2 wherein a dial ratchet and a dosage counter snap-tube each project downwardly from a bottom surface in substantially opposed spaced relation to one another about an axle-tube.

10. A pill bottle according to claim 2 wherein a removable closure seal is disposed in overlying relation to said dial closure.

11. A pill bottle according to claim 1 wherein said internal annular divider comprises at least one of a plurality of discreet posts and discreet vertical walls.

12. A pill bottle according to claim 9 wherein a gear is defined on an inner surface of said an internal annular wall that is complementary to said dial ratchet that projects downwardly from said bottom surface of said dial closure so as to require rotation of said dial closure in a preferred direction.

13. A pill bottle according to claim 1 wherein a first circle of pills wells is surrounded in angular of-set relation by a second circle of pill wells.

14. A pill bottle according to claim 13 wherein a first circle of pills wells is angularly off-set from said second circle of pill wells by an angular incremental amount of between about 3° and about 9° so as to provide for a minimum exposure of yet to be dispensed ones of said plurality of pills during dispensing of a single pill.

15. A pill bottle comprising:

a first annular wall disposed within an interior portion of said bottle and having an outer side surface with a plurality of circumferentially spaced, vertically oriented first ribs that project radially outwardly from said outer surface;

a second annular wall disposed within an interior portion of said bottle in enclosing relation to said first annular wall, and having an outer side surface and an inner surface that both undulate so as to define a series of alternately inwardly and outwardly facing troughs and ridges wherein an adjacent pair of said first ribs is located in spaced confronting relation to each of said inwardly facing troughs so as to define a first plurality of pill wells thereby allowing each pill to be stored resting upon at least one of a tip and an edge; and a third annular wall arranged in spaced apart surrounding relation to said second annular wall, and including a plurality of circumferentially spaced, vertically oriented second ribs that project radially inwardly from an inner side surface wherein an adjacent pair of said second ribs is located in spaced confronting relation to each of said outwardly facing troughs of said second annular wall thereby defining a second plurality of pill wells that allow each of a further plurality of pills to be stored resting upon at least one of a tip and an edge; and a movable closure disposed in overlying relation to said pill wells.

* * * * *

UNITED STATES PATENT AND TRADEMARK OFFICE

CERTIFICATE OF CORRECTION

PATENT NO. : 7,735,684 B2
APPLICATION NO. : 11/693452
DATED : June 15, 2010
INVENTOR(S) : Coe et al.

It is certified that error appears in the above-identified patent and that said Letters Patent is hereby corrected as shown below:

Title Pg, Item (73) Assignee: delete "Designed" and replace with --Design--.

Signed and Sealed this

Twenty-sixth Day of October, 2010

David J. Kappos

*Director of the United States Patent and Trademark Office*